United States Patent Office

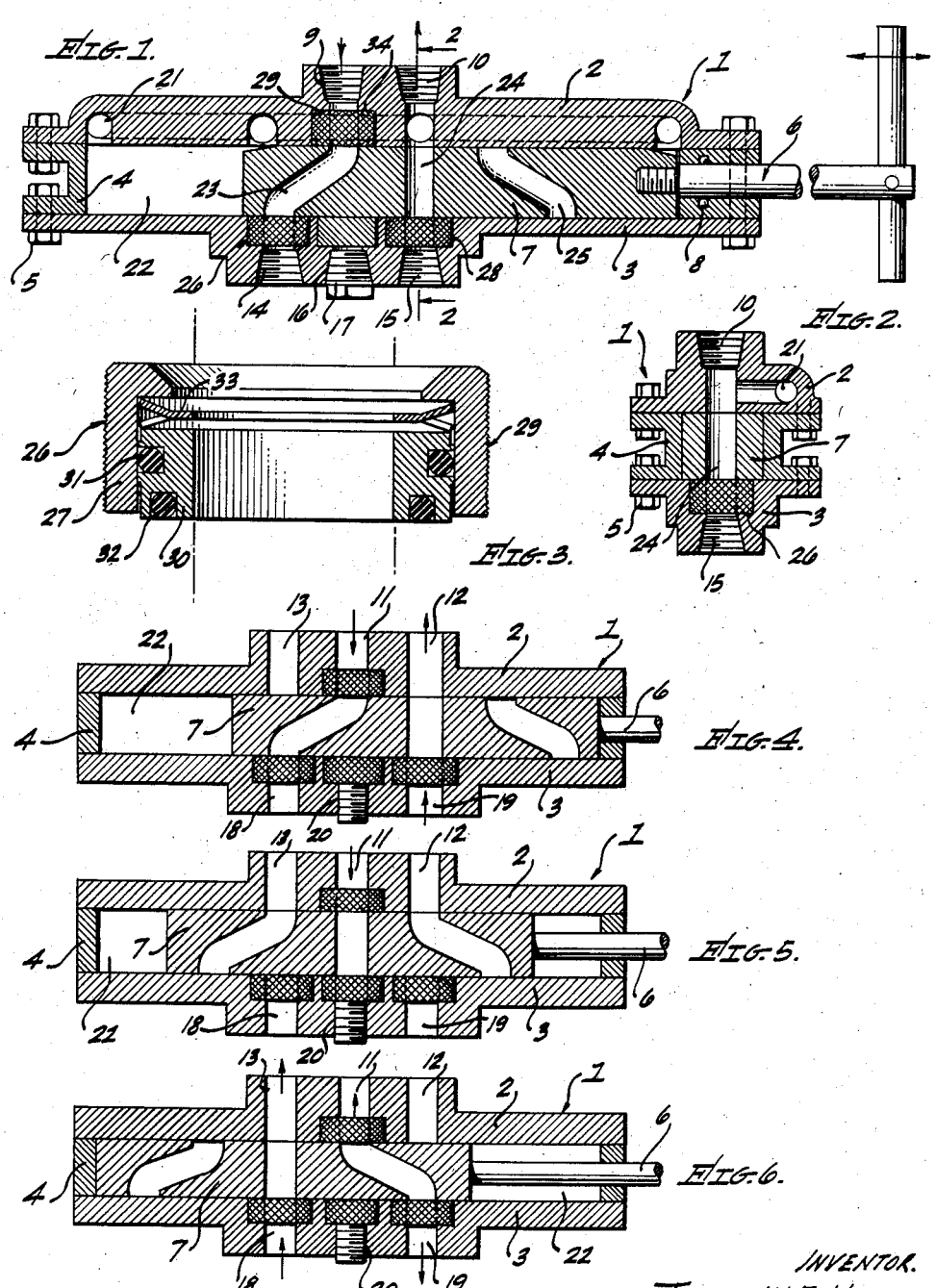

2,858,851
Patented Nov. 4, 1958

2,858,851

PUSH-PULL VALVE

James W. F. Holl, Temple City, Calif.

Application September 16, 1954, Serial No. 456,435

2 Claims. (Cl. 137—625.18)

This invention relates to a push-pull valve in which there are provided a number of ports or passages, the gate of the valve being movable into various positions to align different passages through the valve and thus directing fluid into various courses, as may be required in a hydraulic system or other fluid systems.

An object of my invention is to provide a novel push-pull valve, the body of which is preferably formed in three pieces, each section or piece of which can be machined or formed of bar stock, thus providing a valve which can be easily assembled and easily fabricated.

Another object of my invention is to provide a novel push-pull valve of the character stated, in which the various parts of the housing can be formed of a metal capable of resisting acids or bases, and this valve being relatively inexpensive and simple to manufacture.

Still another object of my invention is to provide a push-pull valve of the character stated, in which the flow of fluid through the valve is substantially straight or has a minimum amount of deflection from a straight line, thus facilitating flow of fluids through the valve.

Other objects, advantages and features of invention may appear from the accompanying drawing, the subjoined detailed description and the appended claims.

In the drawing:

Figure 1 is a longitudinal sectional view of my push-pull valve.

Figure 2 is a sectional view taken on line 2—2 of Figure 1.

Figure 3 is a transverse sectional view of one of the seal seat assemblies.

Figure 4 is a longitudinal sectional view of a valve embodying my invention and showing a different porting arrangement than that of Figure 1.

Figure 5 is a view similar to Figure 4 but showing the gate in another position.

Fig. 6 is a view similar to Figure 4 and showing the gate in still another position.

Referring more particularly to the drawing, the numeral 1 indicates the body of my valve, and this body consists of three parts, a top plate 2 and a bottom plate 3. These top and bottom plates can be readily machined from bar stock and, therefore, a suitable metal can be easily procured which will withstand acids and bases which might flow through the valve. The cylinder portion 4 of the body is positioned between the upper and lower plates 2—3 and may also be machined from bar stock, if it is found expedient. The cylinder 4 and the top and bottom plates 2 and 3 are bolted together by the bolts 5, thus properly assemblying the various parts and also enabling these parts to be disassembled if it is necessary to replace or repair any of the parts of the valve. A pitman 6 extends from the slide plate 7 and the pitman permits the slide 7 to be moved to various positions within the valve body 1, as might be necessary in opening and closing the valve. Suitable packing 8 may be provided in the cylinder portion 4 around the pitman 6 to prevent leakage past this pitman. The top plate 2 may be provided with ports 9 and 10 in which one of these ports is an inlet and the other an outlet. This porting may be altered to provide an additional number of ports, for example, the ports 11, 12 and 13, as shown in Figures 4, 5 and 6. The bottom plate 3 may be provided with the ports 14 and 15 as shown in Figure 1, and between these ports a center port 16, normally closed by the plug 17. To obtain hydraulic balance in the valve the plug 17 is used. However, if hydraulic balance is not essential then the plug 17 can be removed and the port 16 may then be connected to a sump, or the like.

In Figures 4, 5 and 6, I have shown a similar pair of ports 18 and 19 in the bottom plate 3, and the center port 20 which may or may not be plugged or closed as shown. A balance passage 21 is provided in the top plate 2 and extends from one end to the other of the chamber 22 in which the slide or gate 7 moves. This passage is a balance conduit so as to balance hydraulic pressures on both ends of the slide or gate 7. The slide 7 is formed with a number of channels or ports extending vertically therethrough and shown at 23, 24 and 25. These passages can be variously arranged to connect the ports 9—10, 14 or 15. The arrangement shown in Figure 1 is normally termed a four-way valve, although it is evident that other porting can be arranged if desired.

The bottom surface of the top plate 2 and the top surface of the bottom plate 3 are machined and are as nearly parallel as possible. However, there will be some inequalities and, in order that a proper seal may be had against the slide or gate 7, I provide seal seats 26 around each of the ports 14, 15 and 16, each of which are constructed as follows: An outer sleeve 27 fits within a recess 28 in the plate 3 or the plate 2, and the outer surface of the sleeve is knurled, as shown at 29. The purpose of this knurling is to permit fluid to move on the outside of the sleeve and to pass downwardly into the sump part of the valve, or the hydraulic system. Also no close tolerances are required in the plate portion of the valve and the seal seat can also be easily replaced when necessary. An inner sleeve 30 is mounted within the sleeve 27 and the inner sleeve is provided with an O-ring 31 which bears against the inside of the sleeve 27. A second O-ring 32 in the sleeve 30 bears against the bottom of the recess in which the seal seat is mounted. A spring 33 bears against the sleeve 30 and also against the sleeve 27 for the purpose of pressing these sleeves against the plate 3 and the slide 7, respectively. This type of seal seat is also shown and described in my co-pending application, Serial No. 352,675, filed May 4, 1953, on the invention entitled "Rotary Valve With Seal Seat." One or more seal seats 34 may also be provided in the top plate 2 and surrounding the ports 9 or 10, as may be required.

In the "off" position of the valve, as shown in Figure 5, a hydraulic balance will be achieved on both sides of the slide or gate 7, thus enabling this slide to be readily moved back and forth to various positions.

Having described my invention, I claim:

1. A push-pull valve including a top plate and a bottom plate and a cylinder portion arranged between said plates, detachable means securing the plates to the cylinder portion, a gate slidably mounted in the cylinder portion, one face of the gate engaging the top plate and another face of the gate engaging the bottom plate, said top plate having ports extending therethrough, said bottom plate having ports extending therethrough, and said gate having channels extending therethrough, said channels being variously alignable with the ports in the top and bottom plates, a seal seat positioned in various of said ports, each seal seat being positioned within one of the ports, said top and bottom plates having recesses therein from which said ports extend, each seal seat including a first sealing means bearing against a plate in which it is mounted, and a second sealing means bearing against a flat surface of said gate, the outer surface of the first sealing means being knurled to permit passage of fluid around the outside of the first sealing means, and within the recess.

2. A push-pull valve including a top plate and a bottom plate and a cylinder portion arranged between said plates, detachable means securing the plates to the cylinder portion, a gate slidably mounted in the cylinder portion, one face of the gate engaging the top plate and another face of the gate engaging the bottom plate, said top plate having ports extending therethrough, said bottom plate having ports extending therethrough, and said gate having channels extending therethrough, said channels being variously alignable with the ports in the top and bottom plates, a seal seat positioned in various of said ports, each seal seat being positioned within one of the ports, said top and bottom plates having recesses therein from which said ports extend, each seal seat including a first sealing means bearing against a plate in which it is mounted, and a second sealing means bearing against a flat surface of said gate, the outer surface of the first sealing means being knurled to permit passage of fluid around the outside of the first sealing means, and within the recess and one of said plates having a balance passage therein, said passage extending from one end of the gate to the other end thereof.

References Cited in the file of this patent

UNITED STATES PATENTS

| | | |
|---|---|---|
| 39,812 | Hayman | Sept. 8, 1863 |
| 1,237,693 | Prott | Aug. 21, 1917 |
| 1,958,858 | Murray | May 15, 1934 |
| 2,291,563 | Rotter | July 28, 1942 |
| 2,529,412 | Parker | Nov. 7, 1950 |
| 2,601,967 | Larsen | July 1, 1952 |
| 2,601,990 | Holzer | July 1, 1952 |
| 2,628,060 | Parker | Feb. 10, 1953 |
| 2,669,416 | Hilton | Feb. 16, 1954 |
| 2,669,417 | Ray | Feb. 16, 1954 |
| 2,703,217 | Ashton et al. | Mar. 1, 1955 |